C. F. C. KNUDSEN.
MOLDABLE MILK PRODUCT AND METHOD OF MAKING THE SAME.
APPLICATION FILED APR. 3, 1915.
1,160,086.  Patented Nov. 9, 1915.
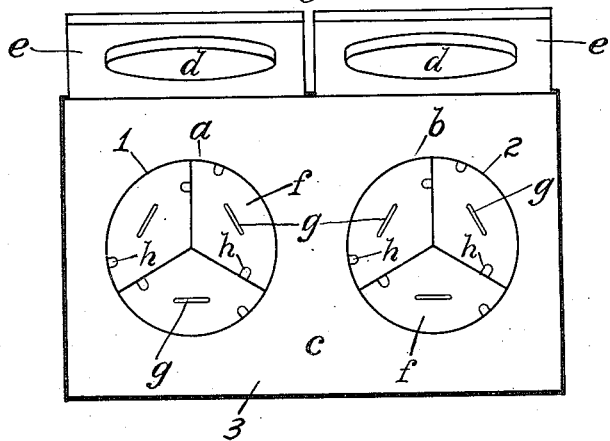
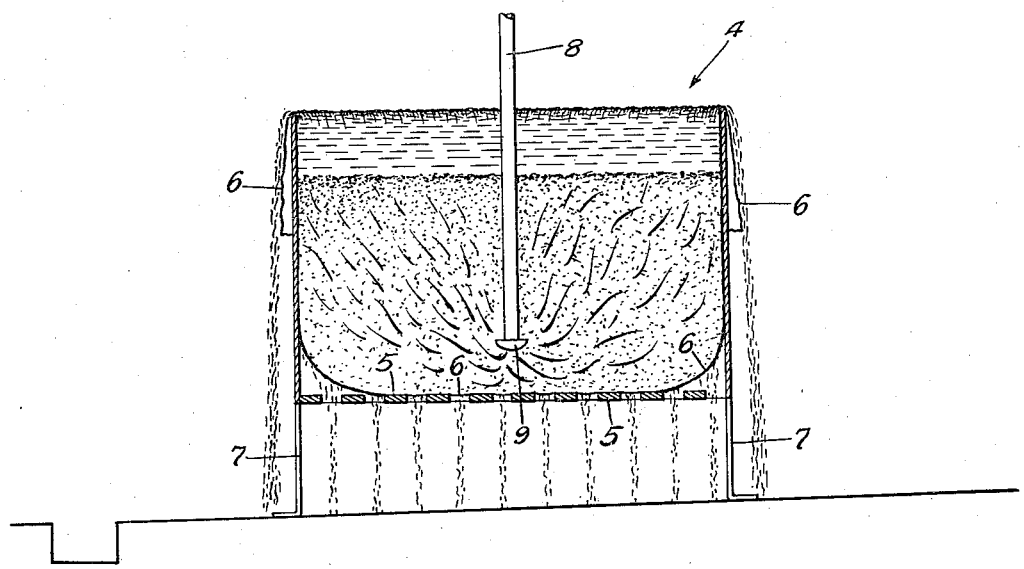
Witnesses
W. N. Kirkby
Estella Hill
Inventor
Carl F. C. Knudsen
by James R. Townsend
his atty.

UNITED STATES PATENT OFFICE.

CARL F. C. KNUDSEN, OF LOS ANGELES, CALIFORNIA.

MOLDABLE MILK PRODUCT AND METHOD OF MAKING THE SAME.

1,160,086. Specification of Letters Patent. Patented Nov. 9, 1915.

Application filed April 3, 1915. Serial No. 19,059.

*To all whom it may concern:*

Be it known that I, CARL F. C. KNUDSEN, a subject of the King of Denmark, having declared my intention to become a citizen of the United States, residing at Los Angeles, in the county of Los Angeles and State of California, have invented a new and useful Improvement in Moldable Milk Products and Methods of Making the Same, of which the following is a specification.

This invention relates to that class of milk products known as and resembling cottage cheese.

It is well recognized that milk products such as cottage cheese and the like are subject to rapid changes at ordinary temperatures; such changes resulting in increase of lactic acid and a consequent sour taste, also other changes of flavor occur and a change in texture to a hard and grainy body.

An object of this invention is to produce a uniform moldable milk product rich in proteid and containing milk sugar and having a pleasing palatability and also having keeping qualities superior to cottage cheese and the like made from skim-milk.

An object is to insure the production of a product of this character that will be and remain of a uniform pleasing quality for at least a week so as to allow the dealer to carry a considerable stock without danger of loss.

A further object of the invention is to produce a superior skim-milk food product.

In this invention I utilize skim-milk; as for instance, the separator by-product commonly produced in dairies where the butter fats are taken out by centrifugal separators.

An object of this invention is the production from said by-product of a soft, creamy mild food product to take the place of cottage cheese and distinguished from cottage cheese in that it is free from the grainy, elastic character and acid taste of cottage cheese, and will remain so for a considerable time under slight refrigeration.

An object is to utilize said skim-milk by-product that is at present mainly un-utilized as a food for mankind.

An object is to eliminate an item of great waste in creameries and dairies and as a result of this invention and discovery as distinguished from previous processes and products known in the art I will here state that prior to the introduction of my new process and product one creamery in Los Angeles was turning into the sewer as waste material a quantity of said skim-milk by-product to the amount of more than one thousand gallons per day, and since the introduction of my new process said creamery has by said process not only utilized all of said one thousand gallons or more per day previously turned into the sewer as waste, but has also bought up the like by-products produced by adjacent creameries and is continuing now to do so to its own profit and to the profit of said other creameries; the by-product thus saved and bought up being utilized by said creamery in the manufacture of this new product, which has become a popular article of common commerce; and the creameries in eight principal cities of California have had a like experience, thus making within a period of less than one year a saving of great value.

The new method and process which I employ in producing this novel food product is as follows, reference being had to the accompanying drawing in which—

Figure 1 is a plan view of an incubator and Fig. 2 is a vertical section of a curd and whey separator, capable of use in conducting parts of the process.

A quantity of pure milk is taken and sterilized by steam heat, by quickly bringing the milk under treatment to a temperature of 220° Fahrenheit in twenty minutes with the well-known steam sterilizer in common use in laboratories. The resulting sterilized milk product is then cooled down to a temperature of 90° Fahrenheit. This is done by putting the vessel containing the sterilized milk product into running water until the desired temperature of 90° Fahrenheit is reached by the sterilized milk product. Then half of the cooled sterilized milk is removed and the cooling continued with the other half until it is cooled to a temperature of 80° Fahrenheit. To the first portion having a temperature of 90° Fahrenheit is added in the manner hereinafter stated a pure culture of *Bacillus Bulgaricus*. To the remaining portion cooled to 80° Fahrenheit is then introduced a pure culture of *Bacillus lactic-acidi*. The proportions found most desirable are one ounce of the pure culture to one quart of milk.

The commercial cultures of *Bacillus Bulgaricus* and of *Bacillus lactic-acidi* are for the purpose of this process regarded as pure.

Each of the two portions of milk with its added bacillus culture is separately stirred and the separate bacillary mixtures thus made are separately placed in a common incubator which will maintain each at the temperature stated, respectively, and both are there kept for a period of eighteen hours; one at the temperature of 90° Fahrenheit and the other at the temperature of 80° Fahrenheit. For convenience and accuracy the two separate cultures are preferably produced in separate three-cornered pressed aluminum vessels, preferably the usual trisector vessels 1, 2 of a common incubator 3; said vessels preferably having a depth of seven inches and having a radius of five inches and capable of containing about twice the quantity of milk required to form a culture; that is to say, where the quantity of pure milk to receive the commercial bacillary fluid is one quart the incubator vessel will be capable of containing two quarts. The incubator wells $a$, $b$ are surrounded by heat insulation $c$ and are closed by insulating plugs $d$ of lids $e$. Each vessel is provided with a cover $f$ having a handle $g$ and held down on the vessel by hooks $h$ so that the closed vessels can be conveniently placed in and removed from the incubator wells. Prior to the expiration of such period of eighteen hours a required quantity of skim-milk or separator by-product above referred to is prepared for reception of the cultures in the following manner: Said skim-milk is pasteurized in the usual pasteurizer; being brought to a temperature of 140° Fahrenheit and being held to that temperature for a period of twenty minutes and then quickly cooled to a temperature of 96° Fahrenheit.

To insure against failure a plurality of cultures are produced simultaneously, the two wells $a$ and $b$ of the incubator being utilized respectively for the separate cultures, so that with the apparatus shown, three charges of each of the cultures are produced at the same time.

A scum rises to the surface of the mixture and at the end of eighteen hours the vessels are removed from the incubator and the upper surface or scum of the charges in the incubating vessels is skimmed off to a depth of about one-fourth of an inch. The scum is thrown away and the remaining content of each vessel is thoroughly stirred in its respective vessel until each of such contents becomes of a smooth creamy consistency. This is done with each of the two cultures. A quantity of the pasteurized skim-milk by-product is previously cooled in a separate container to 96° Fahrenheit and the contents of two vessels containing the two cultures, being about one quart of each culture, and then added to the cooled pasteurized skim-milk, thus practically, or nearly, making a two per cent. mixture; the proportions being about two volumes of the combined cultures to one hundred volumes of the pasteurized skim-milk by-product; that is to say, the amount of pasteurized by-product to which the approximately two quarts of culture may be added with perfect success will be one hundred quarts or twenty-five gallons. The twenty five gallons of cultured mixture is then subjected to a temperature of 96° Fahrenheit for a period of from fourteen to eighteen hours, thus allowing such mixture to coagulate and ripen, with the result that the mixture reaches a gelatinous consistency which determines the completion of the ripening process. Water is then separately heated to a temperature of 180° Fahrenheit, and while thus heated is added to the twenty five gallons of coagulated or gelatinous mixture and slowly stirred until water to the amount of twenty per cent. by volume of the mixture has been added, thus forming a dilute mixture having a temperature of about 100° F. Then the dilute mixture is allowed to stand at such temperature of about 100° Fahrenheit for a period of from ten to twenty minutes. During this period the contents of the container separate into curds and whey, the curd rising to the surface of or being suspended in the whey which tends to sink to the bottom of the container. The curds are then removed from the liquid contents beneath them and are placed in a washing and draining box 4 which is constructed of convenient size with slats 5 in the bottom and in which a closely-woven sheet of cheese-cloth 6 has been spread, the edges of the cheese-cloth being drooped over the edges of the box. As many boxes may be used as the operator deems most convenient and the boxes may be mounted on legs 7. When a mass of curds has thus been placed in a washing and draining box, water is introduced into such mass through a hose 8 extending centrally of the box and having its outlet 9 opening downward near the bottom of the box. The water thus introduced is at a temperature of about 60° Fahrenheit and the washing is continued for a period of about one hour after allowing the water to rise through the curds until the box is filled and water over-flows around the edges. Sufficient water is allowed to flow through the hose to cause the liquid to overflow at the surface in a thin sheet all around the edges of the box. At the same time some portion of the water is drained out through the apertures between the slats 5, said slats being about one inch across and separated by one inch of open space. After the washing has thus been effected, thereby removing the whey and lactic acid from the curd, the water is shut off and the edges of the cheese-cloth are lifted and the contents of the sheet are shaken, thus to loosen the curds from the sheet and allow the liquid to drain through the sheet. Though this washing removes the whey it is found that a quantity of milk sugar remains in the curd. Such shaking and draining may be continued for a period of about ten minutes and then the sheet and its contents are suspended in a refrigerator and brought to a temperature of about 40° Fahrenheit, thus checking the growth of any bacteria that may remain in the curd. The whole mass is allowed to remain in the refrigerator having such temperature of 40° Fahrenheit for a period of twelve hours. Then the mass is removed from the refrigerator and is thoroughly stirred and beaten by suitable mechanism corresponding to that of an ice-cream freezer mechanism, the mass being meanwhile kept at an ordinary atmospheric temperature say, 68° Fahrenheit, more or less, until the mass becomes of a smooth and creamy consistency and is readily moldable; whereupon the finished product thus produced is put in paraffined air tight boxes for distribution and sale.

By keeping the product at a low temperature, say about 40° to 50° Fahrenheit it will remain practically without change for a period of one week more or less.

The final product is characterized as an amorphous milk product composition containing proteid and milk sugar having about two-tenths per cent. of butter fat and somewhat resembling cottage cheese but different therefrom; being practically free from acid, being of low cohesion, being of a smooth creamy consistency and of a creamy color and having a mild nut flavor and taste, and having better keeping qualities than cottage cheese.

I claim:—

1. The amorphous milk product composition set forth containing proteid and milk sugar having about two-tenths per cent. of butter fat and somewhat resembling cottage cheese but differing therefrom being practically free from acid being of low cohesion and being of a smooth creamy consistency and of a cream color and having a mild nut flavor and taste, and having better keeping qualities than cottage cheese.

2. A milk product of an amorphous composition containing proteid and milk sugar and being of a smooth creamy consistency and having a mild nut flavor and taste.

3. In the method of producing a milk food product the step set forth which consists in coagulating sweet skim-milk by means of combined cultures of *Bacillus lactic-acidi* and *Bacillus Bulgaricus* substantially as set forth.

4. In the method of producing a skim-milk food product, the steps set forth which consist in coagulating sweet skim-milk by means of combined cultures of *Bacillus lactic-acidi* and *Bacillus Bulgaricus* in the proportions of about two parts of the bacillary mixture to about one hundred parts of the skim-milk.

5. In the method of producing a skim-milk food product, the steps set forth, which consist in coagulating sweet skim-milk by means of combined cultures of *Bacillus lactic-acidi* and *Bacillus Bulgaricus* in the proportions of about two parts of the bacillary mixture to about one hundred parts of skim-milk, and heating the same and separating and thoroughly washing out the whey.

6. The method set forth of making a skim-milk food product which consists in;—sterilizing pure milk by quickly raising the temperature thereof to 220° Fahrenheit, cooling a portion of said milk to a temperature of 90° Fahrenheit and adding thereto a pure culture of *Baccillus Bulgaricus*; cooling a portion of said milk to 80° Fahrenheit and adding thereto a pure culture of *Bacillus lactic acidi*; separately stirring each portion of the milk with the added bacillus culture therein; incubating bacteria in said milk culture by maintaining each milk culture at the temperature stated, viz., 90° and 80° Fahrenheit, respectively, for a period of eighteen hours and allowing scum to rise to the top; preparing skim-milk by pasteurizing the same to a temperature of 140° Fahrenheit and holding the same at that temperature for a period of twenty minutes and then quickly cooling said skim-milk to a temperature of 96° Fahrenheit; stirring the cultures respectively until they become of a smooth creamy consistency and adding said cultures to the cooled pasteurized skim-milk in the proportions of about two volumes of combined cultures to one hundred volumes of the pasteurized skim-milk; subjecting the cultured mixture thus produced to a temperature of 96° Fahrenheit for a period of from fourteen to eighteen hours, thus allowing the cultured mixture to coagulate and ripen, said ripening being determined by the mixture reaching a gelatinous consistency; adding water at a temperature of about 180° Fahrenheit until water to the amount of twenty per cent. by volume of the cultured mixture has been added, thus forming a dilute mixture having a temperature of 100° Fahrenheit; allowing said dilute mixture to stand for a period of from ten to twenty minutes and allowing the same to separate into curds and whey; removing the curds from the liquid contents; washing out the whey and acids by washing the curds with water for a period of about one hour, thereby removing whey and lactic acid from the curd; draining the liquid from the curd and refrigerating at a temperature of about 40° Fahrenheit, thus checking the growth of bacteria; and stirring and beating the mass at an ordinary temperature until the mass becomes of a smooth and creamy consistency and is readily moldable.

7. The method set forth of making a skim-milk food product which consists in;—adding to a portion of sterilized pure milk at a temperature of 90° Fahrenheit a pure culture of *Bacillus Bulgaricus;* adding to another portion of said milk at 80° Fahrenheit a pure culture of *Bacillus lactic acidi;* separately stirring each portion of the milk with the added bacillus culture therein; incubating bacteria in said milk culture by maintaining each milk culture at the temperatures stated, viz., 90° and 80° Fahrenheit, respectively, for a sufficient period of time, allowing scum to rise to the top; stirring the cultures respectively until they become of a smooth creamy consistency and adding said cultures to cooled pasteurized skim-milk in the proportions of about two volumes of combined cultures to one hundred volumes of the pasteurized skim-milk; subjecting the cultured mixture thus produced to a temperature of about 96° Fahrenheit for a period of from fourteen to eighteen hours, thus allowing the cultured mixture to coagulate and ripen until the mixture reaches a gelatinous consistency; adding water at a temperature of about 180° Fahrenheit until water to the amount of twenty per cent. by volume of the cultured mixture has been added, thus forming a dilute mixture having a temperature of 100° Fahrenheit; allowing said dilute mixture to stand for a period of from ten to twenty minutes and allowing the same to separate into curds and whey; removing the curds from the liquid contents; washing out the whey and acids by washing the curds with water for a period of about one hour, thereby removing whey and lactic acid from the curd; draining the liquid from the curd and refrigerating, thereby checking the growth of bacteria, and stirring and beating the mass until the mass becomes of a smooth and creamy consistency and is readily moldable.

In testimony whereof, I have hereunto set my hand at Los Angeles, California, this 27th day of March 1915.

CARL F. C. KNUDSEN.

In presence of—
 JAMES R. TOWNSEND,
 ESTELLA TOWNSEND.